July 9, 1963     J. L. BURNSIDE III     3,096,681

KALEIDOSCOPIC VIEWER

Filed Sept. 7, 1960     2 Sheets-Sheet 1

John L. Burnside, III INVENTOR.

July 9, 1963

J. L. BURNSIDE III 3,096,681

KALEIDOSCOPIC VIEWER

Filed Sept. 7, 1960

John L. Burnside, III INVENTOR.

United States Patent Office 3,096,681
Patented July 9, 1963

3,096,681
KALEIDOSCOPIC VIEWER
John Lyon Burnside III, Woodside, Calif.
(2220 Astral Drive, Los Angeles 46, Calif.)
Filed Sept. 7, 1960, Ser. No. 54,548
4 Claims. (Cl. 88—15)

This invention relates to kaleidoscopes, and is more particularly directed to providing an improved device for producing kaleidoscopic patterns of objects such as clouds, houses, people, works of art and like objects lying within the field of direct view of the user of the instrument but not contained within the instrument itself. In the instrument according to this invention, a lens is mounted before a set of kaleidoscopic mirrors in such a way that an optical image, formed of rays of light from the chosen object of view, is made to lie within a framed space between the ends of the mirrors and is thereby multiply reflected to produce the desired kaleidoscopic pattern. The pattern that is so produced is viewed by the user of the instrument through an eyepiece of particular design.

The art of the kaleidoscope, insofar as it relates to the instrument in which a drum of particles, a slide, or any other real object forms the subject matter to be reflected has been much elaborated, but this art is of limited value with respect to the complicated optical nature of the instrument of this invention. Although it might be surmised that a lens could be employed with the mirrors to form images of external objects for the mirrors to reflect, there exists no art that I have been able to ascertain for accomplishing this purpose except crudely; for, a marked difference exists between the nature of a real, inverted, optical image of an object and the nature of the view of an object seen directly. This difference interposes obstacles to the successful combination of a lens with the kaleidoscopic mirrors that become sharply evident when the combination in simple form is tried: the kaleidoscopic pattern appears off-center within an irregular, deeply serrated boundary, in a fuzzy outline; the background is dimly gray and obtrusive; and other defects appear.

It is a primary object of this invention to produce an instrument free of these defects and able to produce kaleidoscopic patterns, formed of external objects, that are technically and esthetically in accord with modern taste and requirements.

It is also an object of this invention to provide a kaleidoscope of the class described that shall be light in weight, durable, and fully suited in all ways to provide instruction and deiversion and to serve as a pleasing toy.

It is a further object of this invention to provide housing and optical structure that will be low in cost yet able to obtain and preserve a high degree of precision of alignment of the optical elements, so that the instrument can be made cheaply enough to have widespread distribution and yet so that proper performance of the instrument, and with it the pleasure of its user, will be assured.

These objects and others that will become evident are made clear by means of the following detailed description of an instrument which constitutes a preferred embodiment of the present invention. The first part of the description discloses the structural aspects of the invention, with the aid of FIGURES 1 through 10 of the accompanying drawing; while the second part of the description sets forth the more purely optical aspects and shows how the stated objects of the invention have been achieved.

Figure 5:
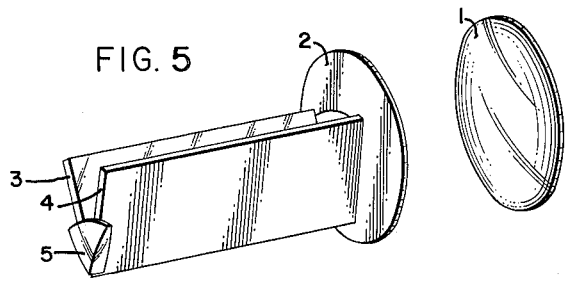
FIGURE 5 shows the optical elements in schematic arrangement.
Figure 6:
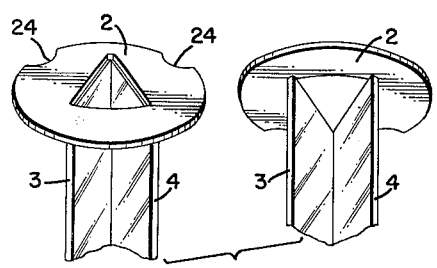
FIGURE 6 shows the mirrors in relation to the apertured disc.
Figure 7:
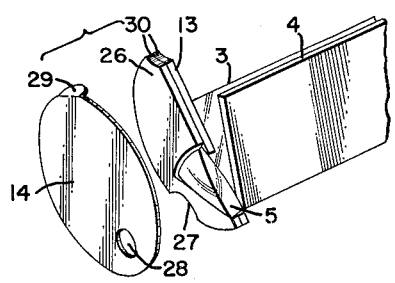
FIGURE 7 shows details of the ocular aperture.

The optical elements of the instrument of this invention, which serve also as elements in the structure, are shown in FIG. 5 divorced from the remainder of the instrument but lying in the arrangement in which they are normally held. The lens 1, a large diameter positive lens of relatively short focal length, receives rays of light from objects in front of it and converges these rays of light toward the apertured disc 2. Element 2 is located near the point where the rays of light from lens 1 combine into a real, inverted optical image, and the aperture in disc 2 serves to frame this optical image and thereby controls the size and form of the kaleidoscopic pattern. The mirrors 3 and 4 multiply reflect the rays of light received on their front surfaces. The eye lens 5 is placed so as to receive and transmit to the eye of the user of the instrument those rays of light that lie closest to the line of contact of the mirrors with each other. Lens 5 is a triangular prism with spherically curved faces.

Referring now to the figures generally, numeral 6 designates the outer shell or housing of the instrument. Shell 6 is made of spiral-wound and glued layers of strong paper and is coated on the outside with thin aluminum foil. Shell 6 terminates at each end in the incurved portions 7 and 8, which serve to retain the remaining parts of the instrument within the housing. Tubes 9 and 10, which are made of spiral-wound and glued layers of strong pasteboard, closely fit the inside of shell 6 and serve to increase the stiffness and strength of the instrument. Tube 9 acts also to establish the proper distance between the objective lens 1 and the apertured disc 2. The mirrors 3 and 4 consist of rectangular plates of thin glass with front surfaces polished and with back surfaces coated with black enamel. The edge of mirror 3, which is in contact with the front surface of mirror 4, is very slightly beveled to assure perfect contact. Mirrors 3 and 4 extend from disc 2, through discs 11 and 12 inside tube 10, to press against disc 13 and eye-lens 5 of the ocular assembly. The mirrors are intentionally made too narrow to reach the wall formed by tube 10.

Figure 1:
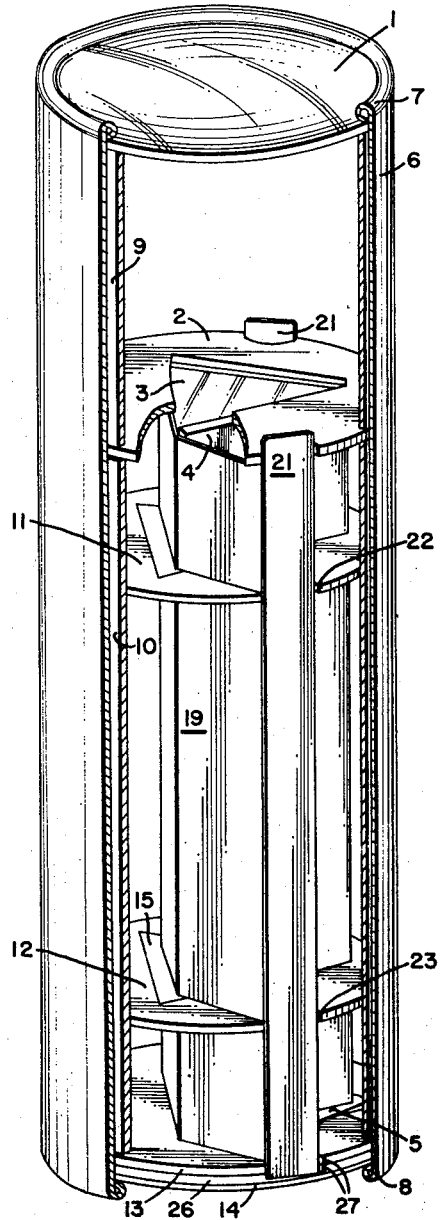
FIGURE 1 is a view in perspective of the complete instrument, with part of the housing cut away to show the inner structure.
Figure 2:
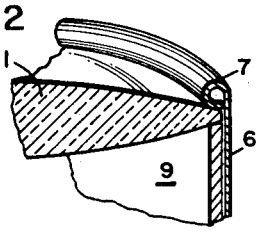
FIGURE 2 shows the mounting of the objective lens.
Figure 3:
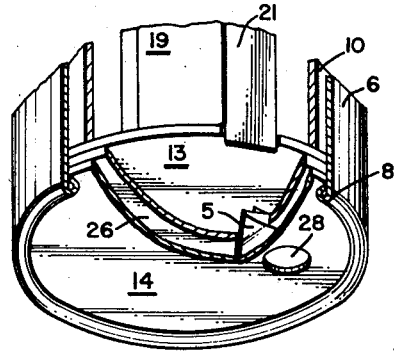
FIGURE 3 shows the structure of the ocular end.
Figure 4:
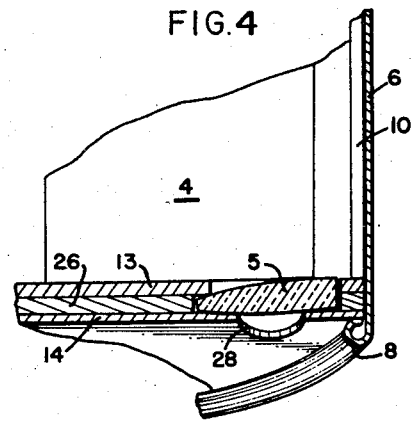
FIGURE 4 shows the mounting of the eye lens in the ocular.

The instrument is assembled by inserting into the empty shell 6, which has already been provided with the one incurved end portion 7, the remaining elements of the instrument, in the order in which they are shown in FIGURE 1, beginning with the large lens 1. After disc 14, the outermost part of the ocular assembly, has been inserted the incurved portion 8 is formed to close the housing. The incurved portions 7 and 8 are produced by pressing the cut ends of the tube into a shallow groove of semicircular form in a heated brass die, which forces the wall of the tube to roll inward then again outward to close upon itself and form a strong and stable ring about one-eighth inch thick, called a curl.

Tube 10 is cut to be slightly shorter than the length of the mirrors 3 and 4, whereas the space inside shell 6 is such as to bring the tube 10 into contact with both the disc 13 of the ocular assembly and the apertured disc 2. Hence the forming of the curl 8 will produce a compressional force in the elements of structure inside the shell 6 in the longitudinal sense, balanced against the corresponding tension in the walls of shell 6. The compressional force is evinced mainly in a slight amount of elastic deformation of the disc 2, which is of heavy pasteboard, caused by pressure of the ends of the mirrors 3 and 4 on its central area while its rim is held against the end of tube 9. This force comprises an elastic preload on the elements of the structure to eliminate play or looseness of the parts and to protect the instrument against the effects of vibration. In addition, the pressure causes the ends of the mirrors to slightly indent discs 2 and 13 where the sharp glass edges contact the cardboard surface, thereby locking the mirrors in optical alignment with the ocular and with the aperture in disc 2.

Figure 8:
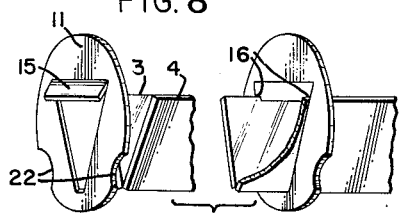
FIGURE 8 shows details of the mirror mounting.

The mirror assembly, which is inserted as a unit following disc 2 when the parts are inserted in order in shell 6 as described above, consists of mirrors 3 and 4, discs 11 and 12, and the card 19. The discs 11 and 12, of heavy pasteboard, are cut with apertures that are nearly triangular in shape, as shown in FIGURE 8. The upper side of the aperture is provided with a hinged flap 15, which is produced by overcutting the sides a short distance and by joining the ends of the cuts with a straight semi-incision. The mirrors 3 and 4 are held in the apertures of discs 11 and 12, with the desired degree of precision of the angle between the faces of the mirrors, the continuity of contact of the edge of mirror 3 with the face of mirror 4, and the necessary firmness and permanency of the arrangement being assured. This is accomplished as follows: the mirrors are first placed in a precise jig which holds them at the correct angle and in full contact. The discs 11 and 12 are next slipped over the ends of the mirrors, with the hinged flaps held upward to provide clearance for the corners and edges of the glass mirrors. When the discs are in place, the hinged flaps are pressed downward again into place. Pressing against the sharp edges of the mirrors, the flaps become notched and grip the edges of the mirrors in these notches 16. The bottom of the aperture in each disc is made slightly too narrow to allow the two mirrors to lie edge to edge. Hence the elastic force of deformation derived from the notches 16 acts to force the mirrors into contact in the bottom of the apertures of the discs 11 and 12, with mirror 3 forced upward and pressing with its edge on the face of mirror 4. The mirrors 3 and 4 retain the precision of alignment with which they were held in the jig after they are lifted out and inserted in the housing.

Figure 9:
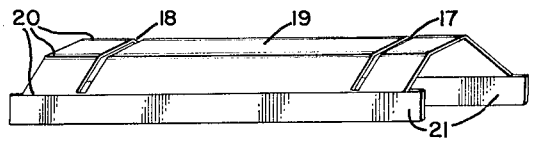
FIGURE 9 shows the card for aligning the mirrors to the other elements of the optical system.
Figure 10:
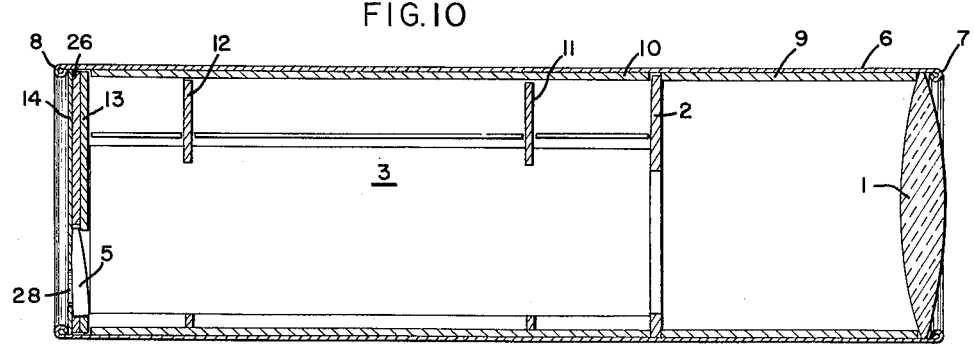
FIGURE 10 shows a cross-section view of the instrument.

Card 19 is placed over the mirrors with discs 11 and 12 penetrating card 19 in the slots 17 and 18, thus locking down the flaps in the discs 11 and 12. Card 19 is bent into the form shown in FIGURE 9 by folding it along the semi-incised lines 20. The side strips 21 of card 19 serve to hold the optical alignment of the mirrors with the aperture of disc 2, and the center of the eye lens, while the elements are being inserted in the housing: the side strips 21 are pressed into the notches 22 and 23 on the sides of discs 11 and 12 and are extended beyond the ends of the mirrors to engage the notches 24 in disc 2 and similarly to engage notches 27 in discs 13 and 26 of the eye lens assembly, as shown in FIGURE 1.

The eye lens 5 is held within the aperture of disc 26 with the thicker part of the eye lens lying against the ends of mirrors 3 and 4 at their junction. The eye lens rests with its thinner part against and upon the rim of the aperture in disc 13. Discs 13 and 26 together thus form a pocket to contain the eye lens 5, holding it so as to bring its outer surface into full contact with the inner surface of the disc 14, thus helping to close the instrument against the entry of dust and moisture, as a result of the pressure that is created with the bending of disc 2 as described above. Disc 14 is made of thin pasteboard coated on its outer side with thin aluminum foil like that of shell 6, and is perforated to provide the aperture 28 through which the user of the instrument will look. The tab 29 on the edge of disc 14 engages with the notches 30 of discs 13 and 26 to assure alignment of aperture 28 over the apex of the faces of the mirrors.

The disc 2 is important not only as an element of structure but also as an optical element. Disc 2 serves as an optical stop in the usual meaning of this term, but it has a further role that determines its proportions according to requirements not shared with telescopes or microscopes but which are unique to instruments of this invention; these requirements relate to the phenomenon of parallax. Parallax in a kaleidoscope evinces itself as a failure of the lines of the kaleidoscopic pattern to join properly across the boundaries of the sectors of the pattern. The cause of parallax is the occurrence of a space between the plane of the ends of the mirrors and the location of the object being viewed kaleiodoscopically. Parallax occurring in the instrument of this invention, insofar as it affects the patterns that are formed of the optical image being viewed, is readily avoided or kept to a pleasing minimum by proper selection of the distance from the objective lens 1 to the plane of the ends of the mirrors. But since the image formed by the lens 1 is not projected onto a screen but is seen directly, in the air, the limits or bounds of the image are set by the rim of the lens 1—that is, in the absence of disc 2, the eye will see as much of the image formed by the lens 1 as is contained within a cone having the eye as apex and the rim of the lens as base. Now the lens is necessarily at a large distance from the plane of the ends of the mirrors, hence the parallax is excessive in the kaleidoscopic pattern that is formed of it. As a result, the seen edge of the lens constitutes a grossly unsymmetrical boundary to the pattern. Disc 2, being located at the point of least parallax, serves to hide the rim of the lens from view and to substitute for the distractingly irregular boundary one which is smooth, regular, and pleasing. It is not enough to stop down the image just to exclude the rim of the lens as seen directly between the mirrors, for the mirrors have a periscopic action which brings the rim of the lens back into view again in those sectors of the pattern that are formed by successive reflections. To be fully successful, the outer rim of the aperture in disc 2 must be brought down to intersect the mirror faces in the two points determined as follows: draw the bisector of the angle between the mirrors and extend it across the apex of the mirrors. In the plane of the ocular end of the mirrors, mark off on this bisector a distance equal to the distance between the axis of the eye lens and the apex of the mirrors; this establishes a virtual point of view from which the eye will see the lower half of the kaleidoscopic pattern rotated upward to lie over the space over the aperture in disc 2 between the mirrors. Now determine a cone with the rim of the lens as base, as before, but with this virtual point of view as the apex of the cone, on the opposite side of the apex of the mirrors from the actual position of the eye. The intersection of the surface of this cone with the ends of the mirrors at disc 2 will establish the limits for the rim of the aperture. Between these limit points the rim of the aperture will produce a circular boundary to the pattern if the rim of the aperture is itself the arc of a circle, but the radius of the rim of the aperture in disc 2 must be equal to two times the distance from the apex of the mirrors to the aforementioned limit points. An aperture in disc 2 that is so determined will just cover the view of the rim of lens 1 in all sectors of the pattern but will not mask off more than is necessary of the useful area of lens 1, which is an important economic consideration. The disc 2 has the further value of shutting off stray light and of hiding the view of the walls of tube 9, with the result that the pattern is seen against a ground of dense blackness, with dramatic effect.

Disc 2 does not alone determine the aperture in the image plane, but only its outermost bond. The image-plane aperture is also set by the faces of the mirrors themselves and has its innermost bound on the point where the apex of the mirrors ends in the plane of their ends. Again the rim of the lens plays an important part, for the innermost bound of the aperture in the image plane must be far enough away from the wall of the tube to hide the rim of the lens from the eye of the viewer. If this is not done, the center of the kaleidoscopic pattern wil be occupied by a blurry and irregular dark form that obscures an area of much interest in the pattern. It suffices if the mirrors are mounted with their apex intersecting the cone which is drawn from the center of the ocular aperture as apex of the cone to the rim of the lens as base, since the consideration of periscopic action of the mirrors does not here apply; that is, the apex of the mirrors at the end farther from the eye must just cover the view of the rim of the lens.

As is well known in the art of the kaleidoscope, the best position for the eye is as close to the apex of the mirrors as possible, but the pupil of the eye, about 5 mm. across, must be accommodated. To assist the eye, the eye lens of the instrument of this invention has been given the shape of a prism, whereby the pattern as a whole is lifted upward and the tendency of the lower half of the pattern to be obscured by the sides of the mirrors near the apex at the ocular end is partly remedied.

The images that are formed of three-dimensional objects by the lens 1 are necessarily themselves three-dimensional—that is, these images extend along the longitudinal axis of the instrument, having depth as well as breadth. In order to give the user of the instrument the opportunity to study the variations in depth of the images and the consequent changes in the kaleidoscopic patterns that result, the eye lens is given a positive power of a few diopters. By this means the kaleidoscopic pattern is thrown into the middle distance for the eye of the observer, where he can make full use of his powers of visual accommodation to changes in distance. The power of the eye lens plays an important part also in determining the two principal dimensions of the kaleidoscopic patterns; these are, the angle of view of the instrument and the angle which is subtended at the eye of the observer by the kaleidoscopic pattern. Proper adjustment of these two variables is very important in achieving a fine effect. In the preferred embodiment described above, the size of the pattern to the eye was chosen to be as great but not greater than that which the eye can take in as a whole in one glance, while the angle of view of the instrument was chosen to be equal to the apparent angular size of the pattern since this was found to bring in just about enough material to make the pattern satisfyingly complicated when the instrument is used in an average living room or garden.

Other embodiments of this invention can be shown to be possible; among these are a kaleidoscopic viewer in which the above described means are employed for the examination of microscopic objects by suitable choice of lens 1 and use of a screen in the aperture of disc 2 to display the image. The instrument can be adapted to all known arrangements of the mirrors in the art of the kaleidoscope. Added sets of mirrors can be used in the instrument to utilize the unused side zones of the lenses 1 and 5, supplying additional smaller kaleidoscopic patterns alongside the central one. Combination of the instrument of this invention with the camera lucida, camera obscura, photographic camera, annd the like are possible.

The uses of this invention are both recreational and educational. As a toy, this invention is many times more diverting than the conventional kaleidoscope because of its vastly greater range of subject matter. As an instrument of philosophical, aesthetic, and psychological research, the instrument of this invention possesses the following attributes: the user selects a part of the visual world to be contemplated by itself, enclosed within a void. So presented, the object acts upon the mind with heightened intensity; its colors appear stronger and its form more charged with meaning, as the effect of dramatic staging. Repetition of the object in a multitude of images acts to emphasize and fix the impression of the object in the mind, through reiteration; and, since these images are disposed in a symmetrical and therefore meaningful array, they act upon the sense of order of the mind, giving a positive or pleasurable reaction and inviting comprehension of the pattern of the whole. Because of its unnatural appearance, the object is recognized by the mind only with difficulty as an everyday article. This holds back the tendency to dismiss the object as not worth contemplating because familiar, thus giving opportunity for this primary responses to form, space, and color to rise in the mind of the observer, stimulating his associative memory and visual imagination. Moving the instrument to produce changes in the pattern, the user adds the pleasure and interest of creative activity and selection to his other responses, often feeling experiences of delight and discovery.

The elements of this invention which I claim as novel and original with me are the following:

1. In a kaleidoscope comprising an elongated sighting tube having an objective end with an objective lens contained therein and an ocular end with an ocular opening contained therein and containing a pair of elongated mirrors with reflecting inner surfaces in trough-shape configuration, a partition comprising a diaphragm dividing the said sighting tube perpendicularly at the principal focal plane of the said objective lens, with a hollow tube extending inside the said sighting tube from the said partition to the said objective lens, with the said mirrors extending from the said partition to the said ocular end, and with the said partition having an optical aperture of substantially triangular shape.

2. The combination in a kaleidoscope as set forth in claim 1, with the two adjacent sides of the said aperture in the said partition lying along the lines of intersection that are formed where the planes of the inner surfaces of the said mirrors cross the plane of the surface of the said partition, and with the third side of the said aperture lying substantially along the line of intersection that is formed, in the space between the said mirror surfaces, where the plane of the said partition is crossed by the surface of a cone, said cone being a non-material geometrical construction having as base the edge of the said objective lens and having as apex that point in the plane of the ocular end of the said sighting tube that lies upon the line of the extended bisector of the angle between the said mirror surfaces and is equidistant with the center of the said ocular opening from the line of junction of the said inner surfaces of the mirrors.

3. The combination in a kaleidoscope as set forth in claim 1, with said mirrors being held in trough-shape formation in one or more discs containing triangular apertures penetrated by said mirrors, with the outermost sides of said apertures comprising hinged flaps and bearing forcibly upon the edges of said mirrors, and with the two adjacent sides of the said apertures being adapted to retain the said mirrors in close contact with each other along their line of abutment.

4. The combination in a kaleidoscope as set forth in claim 1, in which the said sighting tube comprises a close-fitting outer shell with incurved ends, between which the said ocular end, said mirrors, said partition, said inside hollow tube, and said objective lens are held tightly juxtaposed without means of fixed attachment to each other or to the walls of the said outer shell, it being provided that the said sighting-tube outer shell is sufficiently constrained in length between its incurved ends to produce a longitudinal force of compression and to create in the said diaphragm partition a state of convex distortion.

References Cited in the file of this patent

UNITED STATES PATENTS

| 115,269 | Beckers | May 30, 1871 |
| 132,978 | Pool | Nov. 12, 1872 |
| 2,927,574 | Scholz | Mar. 8, 1960 |

FOREIGN PATENTS

| 456,831 | Canada | May 24, 1949 |
| 1,111,442 | France | Oct. 26, 1955 |